Jan. 20, 1942. G. M. MEINZINGER 2,270,758
TIRE REMOVING TOOL
Filed July 31, 1939
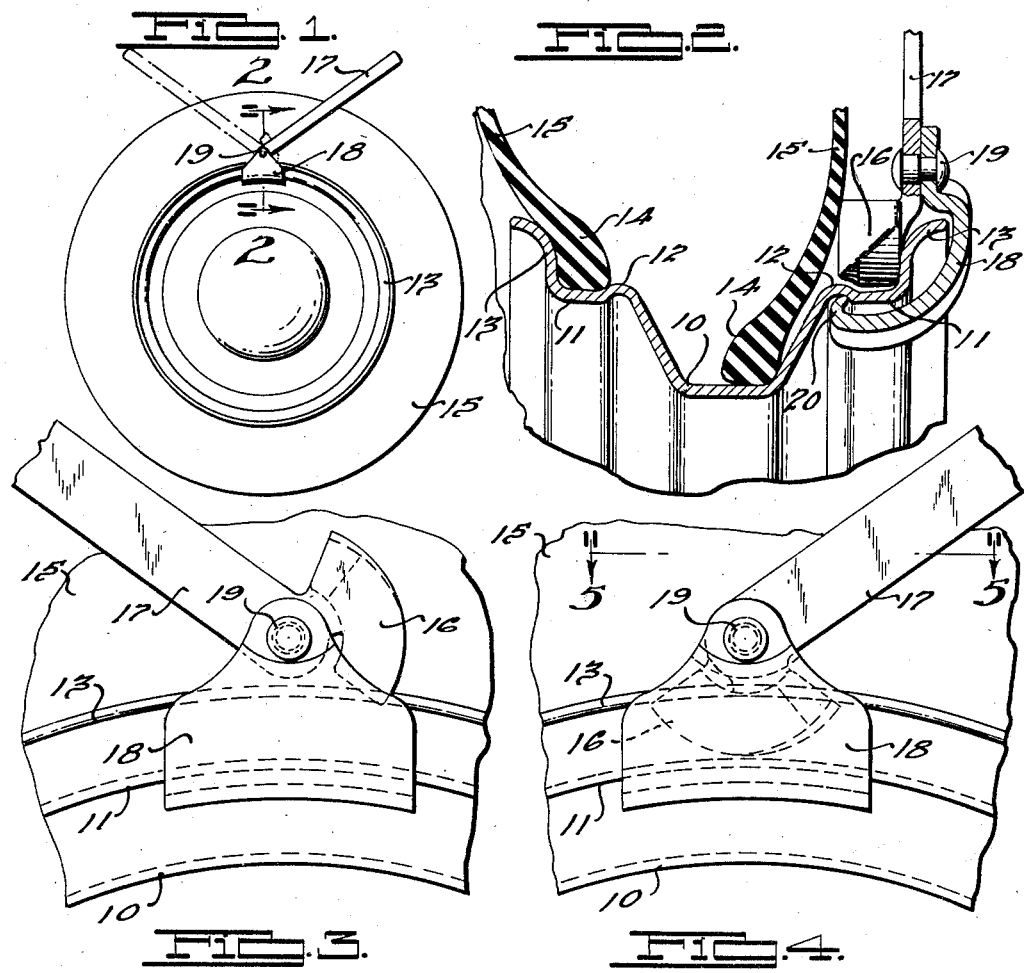
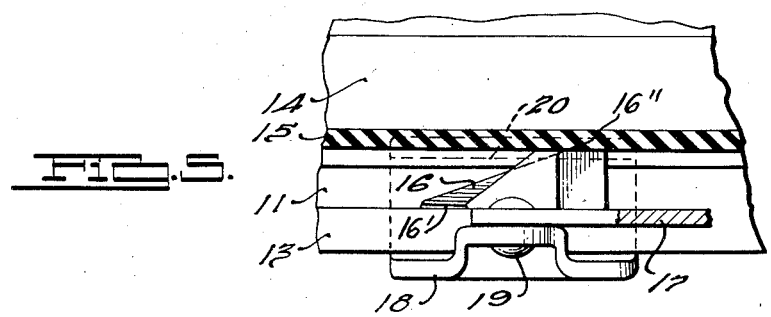
INVENTOR
George M. Meinzinger.
BY Harness, Lind, Patee & Harris.
ATTORNEYS.

Patented Jan. 20, 1942

2,270,758

UNITED STATES PATENT OFFICE 2,270,758

TIRE REMOVING TOOL

George M. Meinzinger, Rockwood, Mich., assignor to Chrysler Corporation, Highland Park, Mich., a corporation of Delaware Application July 31, 1939, Serial No. 287,429

4 Claims. (Cl. 157—6)

My present invention relates to apparatus for removing pneumatic tire casings from wheel rims, particularly automobile tires from automobile wheels, although any other casing may be removed from a rim by the use of a tool embodying the present invention. The invention is of value with respect to a new type of tire rim having a conventional drop center portion and ridges along the edges of the drop center portion forming tire bead engaging troughs adjacent each flange of the rim in order that the beads of a tire casing may be more firmly maintained in position, the bead holding troughs being provided in order to hold the tire casing against accidental removal from the rim immediately following a blowout when the tire casing is in use on a vehicle in motion. A conventional tire may be applied to an improved rim of the type under consideration by slipping both beads of a tire at one side thereof into the drop center portion in order to accommodate stretching of the remaining portions of the beads of the tire casing over the rim and into the drop center portion, whereupon inflation of the tire to a pressure higher than normal will expand the tire casing and force the beads of the tire into the bead holding troughs.

The present invention comprises a simple, inexpensive tool consisting of two forged or cast metal parts pivoted together whereby to form a unitary construction, the parts of which may not become separated and lost. The tool is very simple to operate, merely requiring the affixation of a bead trough clamp to the inner surface of the bead trough, the positioning of a bead moving share between the flange of the rim and the outer surface of the tire casing and the rotation of a share handle through an arc of approximately 90° whereupon the share forces a portion of the tire casing bead inwardly so that it may pass into the drop center portion of the rim. The tool may then be slid to an advanced position and again operated, several operations of the tool at spaced points around the tire rim being sufficient to dislodge the entire extent of the tire casing beads from the bead troughs of the rim.

The principal object of the invention is to devise a tool of the type previously discussed which is easily operated and inexpensively manufactured so as to be available to all owners and operators, in order that highway safety may be advanced by the use of bead trough rims.

Complete details of a preferred form of the present invention are illustrated in the accompanying drawing and described in the following specification wherein like numerals refer to like parts throughout.

Referring to the drawing, Fig. 1 discloses a tire and wheel assembly having a tool made in accordance with the present invention located thereon in the position of usage;

Fig. 2 is an enlarged sectional view of a portion of the tire casing and rim, showing the tool of the present invention in operation, the view being taken substantially along line 2—2 of Fig. 1;

Fig. 3 is a partial elevational view showing the tool in its initial position as located by the operator before the tool has functioned;

Fig. 4 is a view similar to Fig. 3 showing the tool after operation thereof; and, Fig. 5 is a partial plan view taken substantially along line 5—5 of Fig. 4 and looking in the direction of the arrows.

A tire rim of the type for which the present tool is particularly useful is disclosed in Fig. 2, the same comprising a deep drop center portion 10 which is provided for the purpose of facilitating removal of the tire from the rim. The drop center portion is bounded by tire bead holding troughs 11, the drop center portion and the tire bead holding troughs being joined by raised ridge portion 12. The outer edges of the rim are provided with the conventional flanges 13 which support the outer surfaces of the beads 14 of a tire casing 15. The rim is thus similar to conventional tire rims at present in use, with the addition of the ridges 12 between the drop center portion and the tire bead holding portions, which ridges define the inner edges of tire bead holding troughs 11 for the purpose of preventing accidental displacement of the tire beads.

The tool of the present invention comprises two parts, one part comprising a share 16 with an integral handle 17, and the other part comprising a rim clamp 18, the two parts being pivotally attached by means of a rivet 19. The handle 17 is offset with relation to the body of the share 16 so as to permit insertion of the foremost and narrow edge 16' of the share into the angle between the flange 13 and the surface of the casing when the bead is in the trough 11, and the pivotal joint between the two parts of the tool will thereupon overlie the outer edge of the flange 13. The clamp 18 comprises a part having substantial rigidity bent outwardly from the rivet 19, then inwardly and downwardly so as to pass beneath the trough 11 when the tool is in position as previously described. The extreme tip of the clamp 18 is reversely bent to form a hook 20 which is adapted to engage in the groove formed by the ridge 12, so as to prevent displacement of the tool when applied to the rim. The share 16 is preferably segmentally shaped with the pivot at its center of curvature so that the lower edge thereof defines an arc of a circle having a radius slightly less than the distance between the center of the pivot and the bottom of the trough 11 when the tool is in position and the outer wedging face of the share 16 may engage a substantial portion of the bead 14 in order to apply pressure thereto without marring the surface of the tire. The share 16 comprises an arcuate portion increasing in thickness circumferentially from the relatively thin entering edge 16' to a relatively thick trailing edge 16", as illustrated more particularly in Fig. 5. The side face of the share 16 adjacent the rim side wall is substantially flat and disposed in a plane approximately perpendicular to the pivotal axis provided by the rivet 19.

In order to operate the tool it is first placed against the tire rim and held in position with the hook 20 engaged behind the outer surface of the trough 11, and the point of the share 16 engaged in the groove between the inner surface of the flange of the rim and the outer surface of the tire. Slight pressure will then hold the tool in position until the handle is rotated through an arc of substantially 90° to cause the share face to cam the bead 14 out of the groove 11 and over the ridge 12 so that it may pass into the drop center portion 10. Several operations of the tool will suffice to disengage enough of the bead of the tire from the bead holding trough to permit the tire to be removed from the rim.

The shape of the share 16 is such as to accomplish the needed camming action in a movement of approximately 90° in order that a long, inclined face may be used and so that extreme strength in operating the tool is not necessary. The share is also shaped so as to fit down into the trough 11 in order to permit engagement of the share face with the lower edge of the bead 14 so as to apply force to the bead opposite the ridge 12. It is obvious that details of the share may vary while achieving the same result, and that details of the clamp and hook portion may vary without altering the scope of the invention. All such modifications in detail and arrangement as come within the scope of the following claims are considered to be a part of my invention.

I claim:

1. In a tool for facilitating the removal of a pneumatic tire from a rim including an edge portion having a side wall and a ridge providing therebetween a tire bead receiving trough and a groove registering with said ridge; a tire bead engaging share comprising an arcuate portion increasing in thickness from a thin entering edge to a thick trailing edge adapted to effect wedging entrance between the inner surface of the rim side wall and the outer surface of the tire for forcing said tire bead over said ridge, a lever portion for actuating said arcuate portion, and a reaction clamp pivoted to said share at the center of curvature of said arcuate portion, said clamp extending at least partially around the trough of said edge portion and engageable with a wall of the groove and the latter for anchoring said tool with respect to said rim and operable when so engaged to position said share for entrance between said side wall and said tire.

2. In a tool for facilitating the removal of a pneumatic tire from a wheel assembly including a rim having a side wall and a ridge adjacent thereto providing therebetween a tire bead receiving trough; a clamp engageable with said wheel assembly, an operating lever secured to said clamp for relative movement therebetween about an axis, and an arcuately shaped share rigid with said lever for rotary movement thereby to effect wedging entrance between the rim side wall and tire for forcing the tire bead out of said trough, said axis being disposed at the center of curvature of said share, said share including a relatively thin entering end portion adapted to facilitate initial entrance of said share between said side wall and tire and increasing in thickness in a direction circumferentially thereof from said relatively thin end portion to form a relatively thick trailing end portion.

3. In a tool for facilitating the removal of a pneumatic tire from a wheel assembly including a rim having a substantially flat radially extending side wall and a laterally spaced ridge providing therebetween a tire bead receiving trough; a clamp engageable with said wheel assembly, an operating lever secured to said clamp for relative movement therebetween about an axis, and an arcuately shaped share rigid with said lever for rotary movement thereby to effect wedging entrance between the rim side wall and tire for forcing the tire bead out of said trough, said axis being disposed at the center of curvature of said share, said share including a leading end portion having a substantially flat side face disposed in a plane substantially perpendicular to said axis and engageable with said rim side wall and an oppositely disposed face engageable with said tire, said share increasing in thickness from a minimum thickness at said leading end portion to a maximum thickness at a location spaced circumferentially from said end portion.

4. In a tool for facilitating the removal of a pneumatic tire from a wheel assembly including a rim having a tire bead receiving trough at a side wall thereof; an operating lever, a clamp extending from said lever radially inwardly with respect to said wheel assembly and engageable with the latter, means securing the clamp and lever together for relative rotary movement about an axis extending substantially parallel to the axis of the wheel assembly, an arcuate share rigid with said lever having a leading end portion and extending on the side of said axis opposite from said lever and movable by the latter to effect entrance between the rim side wall and tire to force the tire bead out of said trough, said share having its radial outer arcuate extremity concentric with said axis and having a substantially flat side face disposed in a plane substantially perpendicular to said axis, the opposite side face of said share being inclined with respect to the first mentioned side face whereby the thickness between said side faces increases from a minimum at said leading end portion to a maximum at a location spaced circumferentially from the latter.

GEORGE M. MEINZINGER.